INVENTOR
J. H. VOGELSONG
BY Alan C. Rose
ATTORNEY

Nov. 26, 1963 J. H. VOGELSONG 3,112,477

DIGITAL-TO-ANALOG CONVERTER

Filed Dec. 30, 1957 3 Sheets-Sheet 2

INVENTOR
J. H. VOGELSONG
BY Lucian C. Canepa
ATTORNEY

Nov. 26, 1963 J. H. VOGELSONG 3,112,477

DIGITAL-TO-ANALOG CONVERTER

Filed Dec. 30, 1957 3 Sheets-Sheet 3

INVENTOR
J. H. VOGELSONG
BY Alan C. Rose
ATTORNEY

United States Patent Office 3,112,477
Patented Nov. 26, 1963

3,112,477

DIGITAL-TO-ANALOG CONVERTER

James H. Vogelsong, Madison, N.J., assignor to Bell Telephone Laboratories, Incorporated, New York, N.Y., a corporation of New York Filed Dec. 30, 1957, Ser. No. 705,982
1 Claim. (Cl. 340—347)

This invention relates to circuitry for converting digital signals into analog form, and has for its principal object the improvement and simplification of such circuits.

In one aspect, the present invention involves an improvement on the digital-to-analog converter disclosed in B. M. Oliver et al. Patent 2,801,281, granted July 30, 1957. The converter circuitry shown in this patent includes a storage capacitor which is charged incrementally in accordance with the successive digits of a serial binary number. The digits of the binary number are applied to the converter circuit in progressively increasing significance. An appropriate capacitor discharge circuit is also provided to reduce the weight of the less significant digits which provide the first increments of charge applied to the capacitor. At the proper instant following the arrival of the most significant binary digit, the voltage across the capacitor is a true analog representation of the applied digital number.

Sampling of the voltage across the condenser at the proper instant has been a problem in the converter circuitry mentioned in the previous paragraph. Slight variations in the instant of sampling will cause significant errors in the sampled output voltage level. This difficulty can be partially overcome by the proposal disclosed in A. J. Rack, Patent 2,514,671, granted July 11, 1950, which involves the use of wave forming circuitry for flattening the discharge signal at the time of sampling. However, these circuits become relatively complex, particularly when it is noted that a high speed, accurately timed sampling circuit is also required.

Accordingly, an important object of the invention is the improvement and simplification of digital-to-analog conversion circuits.

In accordance with one aspect of the present invention, a digital-to-analog converter of the type discussed above is modified to permit the charging and discharging of the storage condenser by switching circuits during successive portions of each digit period. For specific example, the binary input number may be in the form of a series of pulses or spaces in successive time slots, or digit periods. During the first half of each digit period, the charge on the storage condenser is increased if a pulse is present, and the charge remains unchanged if no pulse occurs. During the second half of each digit period between the arrival of increments of charge, switching circuitry is operated to provide a discharge path through which the condenser is discharged to one-half value. Following the arrival of the most significant digit, however, the discharge circuit is disabled, and the analog voltage appearing on the condenser is held. Accordingly, no additional sampling circuit is required for temporary storage purposes.

In accordance with a feature of the invention, circuitry is provided for selectively charging a storage condenser in accordance with the successive digits of a serial binary code, and switching circuitry enables a discharge path for reducing the charge on the condenser during each of the intervals between the arrival of the successive digits.

In accordance with another aspect of the invention, binary numbers in the so-called "fractional" numbering system may be accommodated by the present digital-to-analog conversion circuits. In the "fractional" numbering system, only numbers between plus and minus one are considered, the most significant binary digit, or bit, is the sign bit, and negative numbers are the true binary complements of the corresponding positive numbers. Thus, for example, the fraction +¾ is represented by the code group 0.110 and the fraction −¾ is represented by the code group 1.010, where the sign bit appears to the left of the binary point. To make these binary numbers produce a uniformly increasing voltage at the converter output as the represented value increases from minus one to plus one, the sign bit must be negated.

In accordance with another feature of the invention, a negation circuit is provided at the input to a converter of the type described above, so that positive and negative numbers in the fractional binary numbering system may be accommodated.

A complete understanding of this invention and of these and various other features thereof may be gained from consideration of the following detailed description, and the accompanying drawing, in which.

Figure 1:
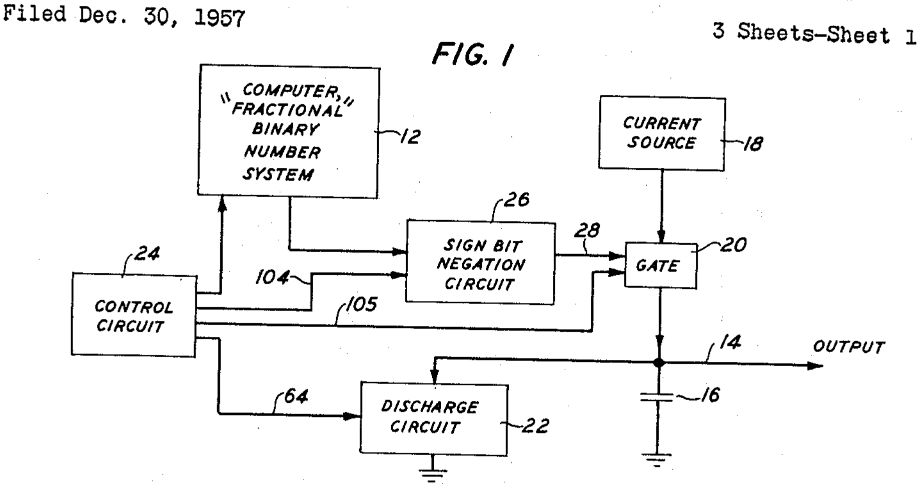
FIG. 1 is a block diagram of a digital-to-analog conversion circuit in accordance with the invention.

In the illustrative circuit of FIG. 1, binary numbers from the computer 12 are decoded, and appear as analog voltages on output lead 14 across the storage capacitor 16. Other components of the circuit of FIG. 1 include the current source 18, the gate 20, the discharge circuit 22, the timing control circuit 24, and the sign bit negation circuit 26.

Figure 2:
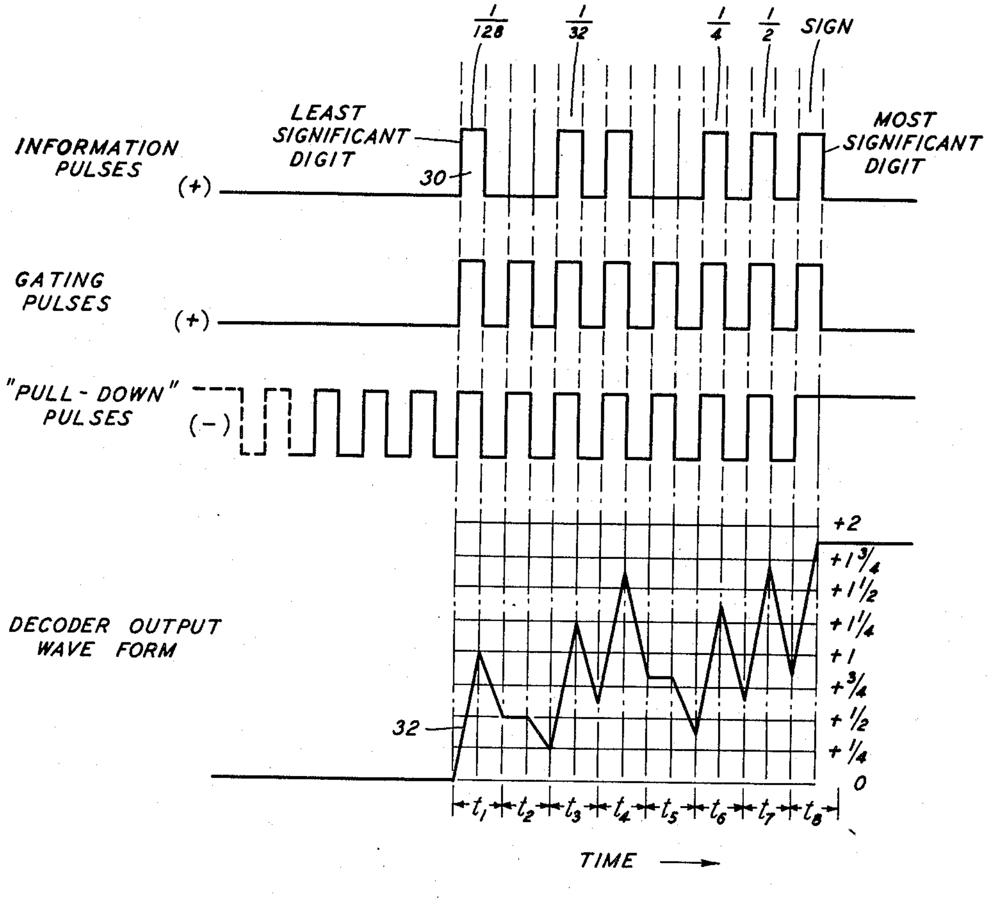
FIG. 2 shows a series of plots which are useful in understanding the mode of operation of the circuit of FIG. 1.

The operation of the circuit of FIG. 1 may best be understood by reference to the plots of FIG. 2. The upper series of pulses in FIG. 2 constitute a representative train of input signals appearing on lead 28. This lead couples the interconnected computer 12 and negation circuit 26 to the gate circuit 20. Under the control of the gate circuit 20, increments of current are supplied from the current source 18 to charge the storage capacitor 16. Thus, for example, the first pulse 30 in the upper train of pulses produces the increase in voltage output across capacitor 16 which is identified by the reference character 32 in the lowest plot of FIG. 2.

In the present illustrative circuitry, each digit period is divided into first and second portions. During the first portion, an increment of charge may or may not be applied to the storage capacitor 16, depending on the presence or absence of a binary pulse in the digit period. During the second portion of a digit period, the capacitor 16 is normally discharged to one half value. This discharge operation is accomplished by the control circuit 24 and the discharge circuit 22. The discharge circuit 22 may, for example, include a resistor of a properly selected value and an electronic gate. Carefully timed output signals from the control circuit 24 permit the discharge of the capacitor 16 to one half value. The signals applied to the discharge circuit 22 are designated "pull-down" pulses. These pulses occur during the second half of each digit period, except the final digit period, of each group of binary signals to be decoded. After the application of the most significant digit to the capacitor 16, pull-down pulses are no longer applied to the switching circuit 22, and further discharge of the capacitor 16 is prevented. In addition, an extended series of pull-down pulses is utilized to discharge capacitor 16 before each conversion operation.

The signals from the computer 12 are supplied to the gate circuit 20 with the least significant digit first. From a physical standpoint, the discharge of the storage capacitor 16 to half value following the arrival of each digit signal corresponds to a reduction in the weighting of each binary digit by a factor of two prior to combination with the next more significant binary digit. When this weighting operation is performed successively during the arrival of an extended group of binary digits, the final output signal on lead 14 constitutes a properly weighted analog representation of the input binary number.

Specifically, during the first portion of the digit period designated $t_1$ in FIG. 2, an increment of charge is applied via the gate circuit 20 to the storage capacitor 16 to charge the capacitor 16 from the level marked 0 to the level marked +1 in the lowermost waveform of FIG. 2. During the second portion of the period $t_1$, the charge on the capacitor 16 decays fifty percent in amplitude to the level marked +½. Then, during the first portion of digit period $t_2$, the charge on the capacitor 16 remains constant due to the fact that, as represented by the uppermost waveform of FIG. 2, no information pulse occurs during that time. Again, during the second portion of the period $t_2$, the charge on the capacitor 16 decays fifty percent in amplitude to the level marked +¼.

Subsequently, during the first portion of digit period $t_3$, another increment of charge is applied via the gate circuit 20 to the storage capacitor 16 to the level marked +1¼. During the second portion of the period $t_3$, the charge on the capacitor 16 again decays fifty percent in amplitude. In a similar manner, the charge level on the capacitor 16 is varied in digit periods $t_4$ through $t_8$ by selective energization of the gating circuit 20 and the discharge circuit 22.

It is significant to note that, in accordance with the principles of the present invention, substantially fixed and constant increments of charge are applied to the capacitor 16 via the gate circuit 20 during each first portion of a digit period in which an information pulse appears. This stems from the fact that, as specified hereinbelow, source 18 is a constant current source and, furthermore, from the fact that all of the positive information pulses of the uppermost signal train of FIG. 2 are of equal width. Hence, since by definition a constant current source such as the source 18 provides a constant current $$\frac{\Delta q}{\Delta t}$$

at its terminals, and since each of the information signal pulses during which charging of the capacitor 16 takes place is of the same width or duration $\Delta t$, it is manifest that a fixed increment of charge $\Delta q$ is added to the capacitor 16 during each charging interval.

Thus, during each charging interval, the charge on the capacitor 16 increases by the same fixed and constant amount, illustratively, as depicted in the lowermost waveform of FIG. 2, by an increment of exactly +1 units.

As mentioned above, one popular numbering system for fixed point binary computers is the so-called fractional binary numbering system. In this numbering system, the computer handles only numbers between plus one and minus one. The numbering system is also characterized in that the most significant digit is the sign bit. When negative numbers are carried as the true binary complement of positive numbers, the sign bit for a positive number is "0," and the sign bit for a negative number is "1."

Figure 3:
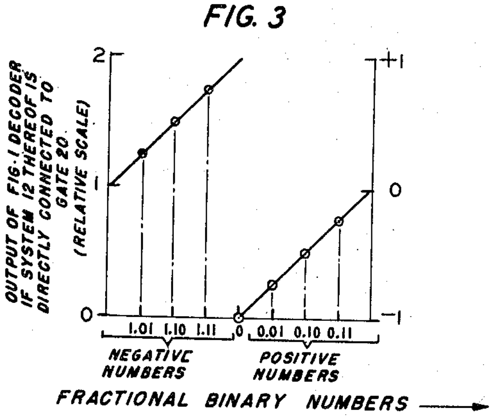
FIGS. 3 and 4 are comparative input-output characteristic curves which point up one feature of the present invention.

The application of numbers in the fractional binary numbering system directly from the system 12 to the gate circuit 20 of FIG. 1 would produce the result shown in FIG. 3. Thus, progressing from the binary number representing minus one through to the number representing plus one, as shown by the abscissa designations in FIG. 3, the resulting discontinuous characteristic has greater ordinate values for negative numbers than for positive numbers. When the sign bit of the fractional binary numbers is negated, however, in accordance with one aspect of the principles of the present invention, the smooth progression of numbers indicated in FIG. 4 results. It may be noted that only three bits are at each point along the abscissa of FIGS. 3 and 4, and only eight bits are shown in FIG. 2. However, the principles of the invention are not limited to words having any particular number of digits, but are applicable to binary numbers of any length.

In other words, if the binary numbers representative of minus one to plus one are applied in progression directly from the system 12 to the gate circuit 20, as indicated by the left-to-right markings on the abscissa of FIG. 3, the output appearing on the lead 14 of FIG. 1 would increase from the level +1 (left-hand ordinate of FIG. 3) to higher levels as the binary numbers increased from minus one to zero. Then, as the binary numbers increased further, from zero to plus one, the output on the lead 14 would increase from the level 0 (left-hand ordinate of FIG. 3) to higher levels, thereby producing the discontinuous function plotted in FIG. 3. The discontinuous nature of this function can easily be verified by plotting, in the manner done in FIG. 2, decoder output waveforms for various values of positive and negative binary numbers.

On the other hand, if in accordance with one aspect of the principles of this invention, the most significant or sign digit is negated by the circuit 26 of FIG. 1, the decoder output level increases in a continuous fashion. As the binary number output of the system 12 progresses from minus one to plus one, this smooth progression of the decoder output level is of the form plotted in FIG. 4, and can be easily verified by plotting the decoder waveform for various values of the modified binary numbers which are marked on the abscissa of FIG. 4.

It is emphasized that the left-to-right markings on the abscissa of FIG. 3 respectively indicate the numbers that would be coupled directly from the system 12 to the gate circuit 20. By contrast, the left-to-right markings on the abscissa of FIG. 4 do not represent the output of the system 12 but instead respectively represent the modified numbers that are coupled from the sign bit negation circuit 26 via the lead 28 to the gate circuit 20. The output of the system 12 for the FIG. 4 case can be represented by an abscissa identical to the one included in FIG. 3. It is noted that the designations of corresponding points on the abscissae of FIGS. 3 and 4 differ in that the digits to the left of the binary points on the two scales are the respective inverses of each other, which results from passing the output of the system 12 through the sign bit negation circuit 26.

In FIG. 1, a single pulse from the control circuit 24 is applied to the sign bit negation circuit 26 in the sign bit digit period of each word. Accordingly, the sign bit is reversed or negated during the transmission of digits from the computer 12 to the gate 20.

Figure 4:
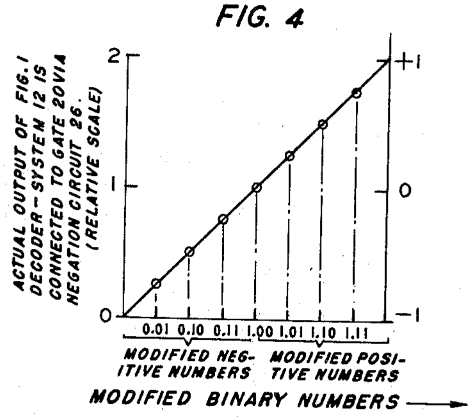

In FIGS. 3 and 4, the ordinate designations at the left and right-hand sides of the plots are different. At the left-hand side of these figures, the designations correspond to the relative scale employed in the lowest wave form of FIG. 2. At the right-hand side of FIGS. 3 and 4, however, output values shifted to the range of plus to minus one are indicated.

Figure 5:
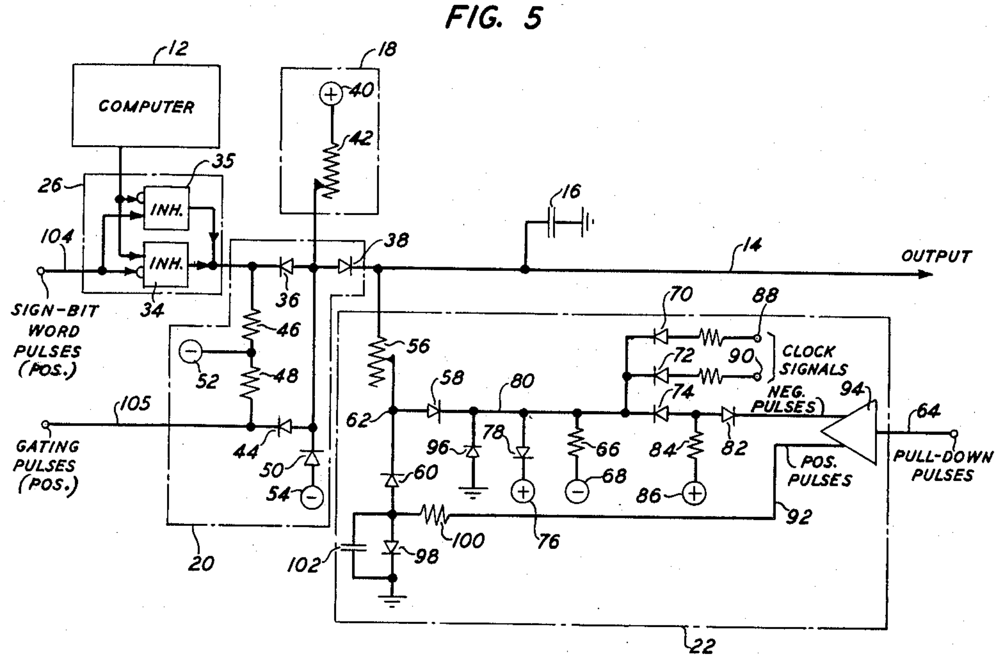
FIG. 5 is a circuit diagram corresponding to the block diagram of FIG. 1.

FIG. 5 is a detailed circuit diagram of one illustrative arrangement for implementing the conversion circuits of the present invention. Before considering the details of the circuit of FIG. 5, it may be noted that the circuitry is designed to be employed with synchronous serial binary computing circuitry of a type which is becoming increasingly well known in the art. For example, the following three comparatively recent articles deal with various phases of this subject matter: "Transistor Amplifiers for Use in a Digital Computer," by Q. W. Simkins and J. H. Vogelsong, which appeared at pages 43 through 55 of the January 1956 issue of the Proceedings of the I.R.E., volume 44, No. 1; "Regenerative Amplifier for Digital Computer Applications," by J. H. Felker, Proceedings of the I.R.E., November 1952, pages 1584 through 1597, November 1952, volume 40; and an article by J. H. Vogelsong entitled "A Transistor Pulse Amplifier Using External Regeneration" which appeared at pages 1444 through 1450 of the October 1953 issue of the Proceedings of the I.R.E., volume 41.

In synchronous binary computing circuitry, it is customary to have a master timing, or "clock," signal source. The clock signals may be provided in four phases, with each successive phase being shifted with respect to the preceding phase by 90 degrees. This permits synchronous operation of successive logic circuits with a delay of only one-quarter digit period, or clock cycle, between successive operations which require synchronization or amplification. In addition, the control circuit, such as that shown at 24 in FIG. 1, normally includes circuitry for providing digit pulses during any desired pulse period of a "word" which may occur in the computer cycle. To accomplish this function, the control circuit may, for example, include a series of ring counters which operate at progressively increasing speeds. Thus, for example, a fast ring counter may step one position for each input digit period, and may have one stable state corresponding to each digit period of a word of the computer. The next slower ring counter may be stepped once for each complete cycle of the fast or word peroid ring counter. Through the use of coincidence circuits coupled to selected stages of the different ring counters, control pulses may be obtained which occur in any desired pulse period of any word of a program cycle.

Proceeding with a detailed consideration of the circuit of FIG. 5, the computer 12 supplies information signals to the inhibit circuits 34 and 35, which are applied in modified form to the gate including diodes 36, 38, and 44. As will be explained below, these signals control the charge applied to the storage capacitor 16. The operation of the inhibit circuits 34 and 35, which constitute the sign bit negation circuit 26 of FIG. 1, will now be considered. An inhibit circuit normally includes at least one normal input lead and an inhibiting input lead, which is marked by a semicircle at the point where the lead is coupled to the inhibit unit. In the absence of pulses applied to the inhibit lead, pulses applied to the normal input lead are transmitted through to the output of the inhibit unit. When pulses are applied to the inhibiting input lead, however, they override other input signals and block output signals. As applied to the sign bit reversing circuit including inhibit units 34 and 35, pulses are applied from the control circuit 24 over lead 104 to the inhibiting input of circuit 34 and to the normal input of inhibit unit 35 only during the sign bit digit period. Thus, the output signals from computer 12 are normally transmitted through inhibit unit 34. However, in the sign bit digit period, the output from inhibit unit 34 is blocked and the signal at the output of inhibit unit 35 is the negated value of the binary signal from computer 12.

Returning to a consideration of the charging circuit for capacitor 16, the constant current source includes the positive voltage terminal 40 and the variable resistor 42. The application of increments of current from the current source to the storage capacitor 16 is under the control of the gate including the diodes 36 and 38, the additional diode 44, and the two resistors 46 and 48. The additional clamp diode 50 also plays a part in the operation of the circuit.

The resistors 46 and 48 and the voltages applied at terminals 40, 52, and 54 are such that current normally flows from terminal 40 through resistor 42, and from terminal 54 through the diode 50 to the lead interconnecting the anode terminals of diodes 36 and 44. From this lead, current flows through diodes 36 and 44 and associated resistors 46 and 48 to the negative potential point 52. When positive pulses which are significantly greater than the maximum voltage which appears on output lead 14 are applied to diodes 36 and 44, they become back-biased; the gating pulses from control circuit 24 are applied to diode 44 over lead 105. The clamp diode 50 is also back-biased. A well defined current from the large positive voltage source coupled to terminal 40 flows through the resistor 42 and is now switched to flow through the diode 38 to apply an increment of charge to the storage capacitor 16. During the time that diode 38 is in the low impedance state, no current flows into the branch path including the variable resistor 56, as both of the diodes 58 and 60 are back-biased.

The discharge circuit including the branch path in which the resistor 56 is located will now be considered. Initially, it might be noted that the relative complexity of the present circuit is dictated in part by the low voltage levels, and in part by the accurate timing of the discharge pulses which are employed in the present conversion circuits. For example, the maximum output voltage on the lead 14 is never greater than two volts. To provide a discharge circuit which operates satisfactorily at these voltage levels requires moderately sophisticated circuit techniques. In general, it may be stated that the point 62 to which the resistor 56 is connected changes from an impedance state in which it is a substantial open circuit when the diodes 58 and 60 are back-biased to a point which is essentially at ground potential when pull-down pulses are applied from the control circuit 24 to lead 64. The relative values of the resistor 56 and the capacitor 16 are such that the two elements have a time constant which produces a decay to half value during the pull-down interval.

During the portion of each digit period when the capacitor 16 is being charged, the diodes 58 and 60 are back-biased. Considering the circuit associated with diode 58, the voltage level is determined by the resistor 66, the negative potential source coupled to terminal 68, and by the current flow from the three diodes 70, 72, and 74. In addition, the positive voltage source coupled to terminal 76 and the associated clamp diode 78 limits the voltage on lead 80 to a value which is slightly more positive than the two-volt level of the source connected to terminal 76. It is further noted that the maximum value on the capacitor 16 is two volts. Accordingly, the lead 80 is always at a more positive potential during this charging interval, so that the diode 58 is back-biased.

The action of the circuit including the diode 82, resistor 84, and the voltage source coupled to terminal 86 should also be considered in connection with the maintenance of a positive voltage on lead 80 during the capacitor charging portion of the cycle. One of the functions performed by the circuit including the diode 82, resistor 84, and the voltage source coupled to terminal 86 is to preclude reduction of the voltage on lead 80 to ground potential by the concurrent presence of negative-going clock signals on terminals 88 and 90, in the absence of pull-down pulses applied to lead 64. Incidentally, FIG. 6, which will be discussed below, shows the timing relationship of the clock signals applied to terminals 88 and 90 and the pull-down pulses applied to lead 64.

During this capacitor charging portion of the cycle, the diode 60 is also maintained back-biased. This is accomplished by the negative voltage reference level on output lead 92 from the pulse regenerator 94.

Considering the operation of the circuit upon the application of pull-down pulses to the lead 64, these signals have the effect of reducing the potential on lead 80 substantially to ground potential. In this regard, the diodes 70, 72, and 74 and their associated circuits constitute a negative-going AND gate. Thus, when negative signals are applied to the clock input leads 88 and 90 and to the diodes 82 and 74 from amplifier 94, the three diodes 70, 72, and 74 are all back-biased. Under these conditions, the flow of current from these diodes through resistor 66 to the negative source coupled to terminal 68 is blocked. The blocking of current from diodes 70, 72, and 74 also has the effect of back-biasing diode 78. Current now flows from ground through diode 96 and from point 62 through diode 58 toward resistor 66 and the negative potential source coupled to terminal 68. The voltage drop across diode 96 is a few tenths of a volt, thus producing a slight negative voltage on lead 80. However, the voltage drop across diode 58 is of approximately the same magnitude but is opposite in sense. Accordingly, the potential at point 62 is maintained very close to ground potential during the capacitor discharge intervals.

The diode 60 and its associated circuitry is provided to maintain the point 62 more nearly at ground potential during pull-down intervals than might be possible with a single circuit such as has been described above. As in the case of the diodes 58 and 96, the diodes 60 and 98 constitute a pair of oppositely poled diodes having positive and negative voltage drops from the ground reference point. With this arrangement, in the presence of pull-down pulses both diodes 60 and 98 are forward biased, and compensating voltages producing the desired ground potential at point 62 are developed. The resistor 100 is provided for current limiting purposes and the capacitor 102 maintains the proper potential across diode 98 even if control pulses on the two output leads from amplifier 94 are not precisely synchronized in their control operation functions.

Figure 6:
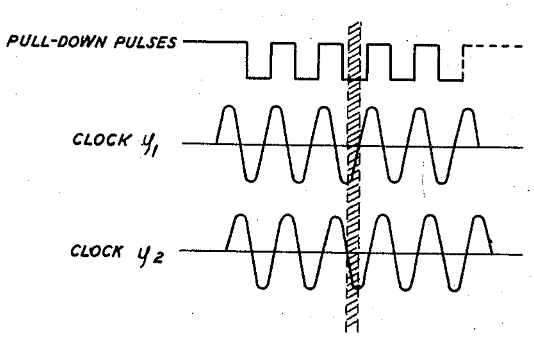
FIG. 6 shows a series of plots which are helpful in the interpretation of the circuit of FIG. 5.

The action of the clock signals in controlling, or strobing, the negative pull-down pulses will now be considered with reference to the diagram of FIG. 6. More specifically, it may be noted that the wave forms of the two clock voltages shown in the lower two plots of FIG. 6 are displaced from each other by 90 degrees. These two clock signals are supplied to terminals 88 and 90, respectively, of FIG. 6. The overlapping portions of the negative-going half cycles produce a time interval 90 degrees in width which occurs at a central point of each negative-going pull-down pulse. One such time interval is shown in shaded form in FIG. 6. In passing, it may be noted that this centering occurs as a result of inherent delay in the action of the pulse regenerator 94. In the diagram of FIG. 6, it may be observed that the shaded area indicating the duration of a pull-down interval is only approximately 90 degrees of the clock period. This arrangement permits the adjustment of the time constant of resistor 56 and the storage capacitor 16 to a value which is independent of the exact pulse width of pulses from regenerator 94. With this circuit configuration, a different packaged amplifier may be substituted for the amplifier 94 of FIG. 5 without the necessity of readjusting the discharge circuit.

It is to be understood that the above-described arrangements are illustrative of the application of the principles of the invention. Numerous other arrangements may be devised by those skilled in the art without departing from the spirit and scope of the invention.

What is claimed is:

In combination in a system for converting digital signals into low-level analog output voltages, means for supplying positive and negative binary numbers in the fractional binary numbering system with the least significant digit first, means including inhibiting circuitry for modifying said numbers by negating the sign bit of each of said numbers, a capacitor, means connecting one terminal of said capacitor to a point of reference potential, means for selectively applying substantially fixed increments of charge to the other terminal of said capacitor during successive intervals in accordance with the successive binary digits of said modified numbers, and means for reducing the charge on said capacitor by one half between each of the digit intervals in which charge may be applied to said capacitor, said last-mentioned means including a resistor and means connecting one terminal of said resistor to said other terminal of said capacitor, said means for reducing the charge on said capacitor further including at least one pair of diodes connected in series opposition between the other terminal of said resistor and said point of reference potential, said means for reducing the charge on said capacitor still further including circuitry for supplying pulses to bias each of said diodes to the low resistance state, said pulses being discontinued upon the arrival of the signal representing the most significant digit, whereby the other terminal of said resistor is maintained at approximately the aforementioned reference potential during the time in which biasing pulses are supplied to said series-opposed diodes.

References Cited in the file of this patent

UNITED STATES PATENTS

| | | |
|---|---|---|
| 2,399,668 | Francis | May 7, 1946 |
| 2,686,632 | Wilkinson | Aug. 17, 1954 |
| 2,729,812 | Jahn | Jan. 3, 1956 |
| 2,736,889 | Kaiser et al. | Feb. 28, 1956 |
| 2,932,017 | Prince | Apr. 5, 1960 |